United States Patent
Boomgaarden et al.

(10) Patent No.: US 9,004,403 B2
(45) Date of Patent: Apr. 14, 2015

(54) CONTAINER FOR A SUPPLY UNIT, OXYGEN SUPPLY DEVICE AND PASSENGER SUPPLY UNIT AND SYSTEM OF AN ARRANGEMENT OF A NUMBER OF CONTAINERS

(75) Inventors: Gunter Boomgaarden, Scharbeutz (DE); Mark Niedostatek, Wenzendorf (DE); Wolfgang Rittner, Ahrensbok (DE); Hasso Weinmann, Lubeck (DE); Rudiger Meckes, Berkenthin (DE)

(73) Assignee: Zodiac Aerotechnics, Plaisir (FR)

( * ) Notice: Subject to any disclaimer, the term of this patent is extended or adjusted under 35 U.S.C. 154(b) by 504 days.

(21) Appl. No.: 13/189,681

(22) Filed: Jul. 25, 2011

(65) Prior Publication Data
US 2013/0026201 A1 Jan. 31, 2013

(51) Int. Cl.
*B64D 11/00* (2006.01)
*A62B 25/00* (2006.01)

(52) U.S. Cl.
CPC .............. *A62B 25/005* (2013.01); *B64D 11/00* (2013.01)

(58) Field of Classification Search
USPC ........ 244/118.5, 118.1; 128/206.27; 206/470; 220/647, 675, 669, 62.22
See application file for complete search history.

(56) References Cited

U.S. PATENT DOCUMENTS

| | | | | |
|---|---|---|---|---|
| 3,682,351 | A | * | 8/1972 | De Putter ...................... 206/505 |
| 5,816,244 | A | * | 10/1998 | Aulgur ...................... 128/206.27 |
| 2011/0139785 | A1 | * | 6/2011 | Strange et al. ................ 220/283 |
| 2012/0118900 | A1 | * | 5/2012 | O'Hagan et al. .............. 220/669 |

FOREIGN PATENT DOCUMENTS

| | | |
|---|---|---|
| EP | 0545118 EP | 6/1993 |
| EP | 2168635 | 3/2010 |
| WO | 9743178 | 11/1997 |

OTHER PUBLICATIONS

Search Report dated Feb. 9, 2012 in related European Patent Application No. 11175262.2.
Europe Application No. 11175262.2, Examination Report dated Jun. 23, 2014, 4 pages.

* cited by examiner

*Primary Examiner* — Brian M O'Hara
(74) *Attorney, Agent, or Firm* — Kilpatrick Townsend & Stockton LLP; Dean W. Russell; Davidson G. Lucas

(57) ABSTRACT

The invention is related to a container for a supply unit, in particular an oxygen supply unit and/or a passenger supply unit (PSU), having a container well at least, wherein a container door can be pivotably joint at a container well's edge, in particular pivotable about a hinge at the container well's edge, wherein the container well at least consists of a sheet moulded compound material moulded from a composite of thermoset sheet material based on fiber-reinforced polymer matrices mainly.

19 Claims, 2 Drawing Sheets

Figure 1:
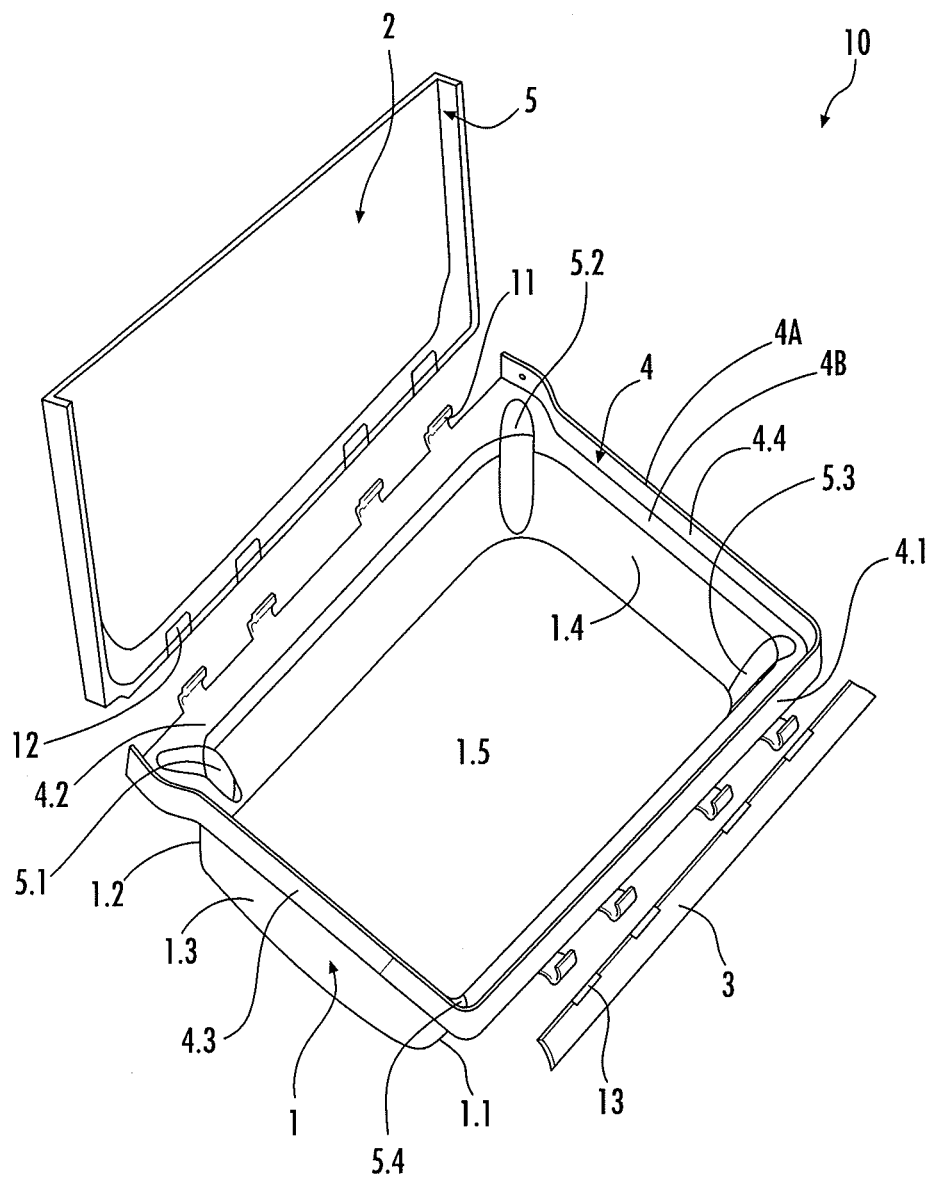

CONTAINER FOR A SUPPLY UNIT, OXYGEN SUPPLY DEVICE AND PASSENGER SUPPLY UNIT AND SYSTEM OF AN ARRANGEMENT OF A NUMBER OF CONTAINERS

The invention relates to a container for a supply unit, in particular an oxygen supply unit and/or a passenger supply unit (PSU), having a container well at least, wherein a container door can be pivotably joint at a container well's edge, in particular pivotable about a hinge at the container well's edge. Further the invention relates to an oxygen supply device having an oxygen supply unit stored in the container. Further the invention relates to a passenger supply unit (PSU) having a passenger appliance stored in the container. Further the invention relates to a system of an arrangement of a number of containers, each for a supply unit, in a ceiling-panel along an aircrafts cabin, in particular along an aircrafts cabin alley of seats, wherein each supply unit is stored in a container.

A passenger service unit as known in the state of the art are widely used in civil aircraft comprising for instance a reading light, a passenger or crew air or oxygen supply device, oxygen masks, warning lights and the like passenger appliances. In particular an oxygen supply unit usually is part of an oxygen supply device wherein the unit is stored in a container of the aforementioned kind. In some aircrafts one passenger service unit is provided for each seat of a passenger and crew member. In other aircrafts one single passenger service unit is provided for a number of the seats, for instance in a particular for a row of seats. A row usually is aligned crosswise to an alley of seats.

Containers of oxygen supply units of the aforementioned kind usually are arranged adjacent to each other, side by side, to allow an arrangement of a number of oxygen supply devices in a ceiling-panel along an aircrafts cabin, in particular along an aircrafts cabin alley of seats. Such oxygen supply devices are adapted to temporarily or continuously provide oxygen to a passenger or crew member of an aircraft. Various methods of generating oxygen ere known; basically one is adapted for physically generating oxygen gas by means of an oxygen pressure cylinder and another one is adapted for chemically generating oxygen by means of a chemical oxygen generator or another one could be an OBOGS (on-board-oxygen-generating-system) or centralized Gaseous Oxygen Systems. Thereby a certain amount of air or continuous air flow comprising a sufficient or high concentration of oxygen can be provided to a passenger or crew member like for instance described in laid-open European patent application EP 2 168 635 A1 of the applicant.

A general desire associated with modern aircrafts is to provide an in general lightweight appliance which also holds in particular for the aforementioned container for an oxygen supply unit. Also efficient manufacturing and maintenance of the aircraft and in particular the safety relevant systems are desirable; however nevertheless a safety standard according to numeral regulations shall be met. In particular this holds for an aforementioned container for an oxygen supply unit which e.g. has to withstand safely relative high surface temperatures when using a chemical oxygen generator for generating oxygen in the container. Further the container for an oxygen supply unit shall be resistant against an accumulation of electrical load on the container; this is to avoid in any case not allowable electrical discharges or the like which would endanger electrical safety systems in the aircraft. Thus the container must not be inflammable or meltable even upon extensive heat or flame exposure.

Nevertheless even in case of a chemical, electrical or heat impact or the like hazardous impact to the container a mechanical strength of the container shall be such that the container is able withstand stress and pressure be that it may from the surroundings of the container or from an aircrafts cabin construction. In EP 0 545 118 B1 a container of the introduction is described, wherein mechanical stability is achieved by numerous depressions from a container wall or the like. It is desirable to provide an improved adjustment of the mechanical stability of a container for an oxygen supply unit also considering the aforementioned demands and safety requirements of the container.

Accordingly, it is a major object of the present invention to provide a container for an oxygen supply unit which as such is improved in mechanical strength. Further it is an object of the invention to provide a mechanically strengthened container for an oxygen supply unit wherein nevertheless the container is resistant to hazardous impacts. Still further it is an object of the invention to provide a mechanically strengthened container for an oxygen supply unit resistant to hazardous impacts and which is nevertheless easy to manufacture; also easy maintenance or assembling in an aircrafts cabin is preferred. It is still further another object of the invention to provide a container which has sufficient mechanical strength when arranged adjacent to one or two further containers in a row of a number of containers for oxygen supply devices in a ceiling-panel along an aircrafts cabin.

As relates the container the object is achieved by a container of claim 1. In accordance with the invention the container has a container well wherein the container well at least consists of a sheet moulded compound material moulded from a composite of thermoset sheet material based on fiber-reinforced polymer matrices mainly.

The invention also leads to an oxygen supply device having an oxygen supply unit stored in a container according to the invention. The oxygen supply unit can be based on oxygen pressure effect and thus has an oxygen pressure cylinder. Additionally or alternatively the oxygen supply unit can be based on chemical oxygen generation and thus has a chemical oxygen generator. In particular the combination comprises a chemical oxygen container combined with an oxygen pressure buffer and a downstream connected electronic or mechanical float regulator.

The invention also leads to a passenger supply unit (PSU) having one or more passenger appliances stored in a container according to the invention. Thus the inventive concept recognized, that in a first variant a passenger appliance and an oxygen supply unit can each be stored in a segregated configuration in a container according to the invention.

In a particular preferred development the invention also leads to a passenger supply device having a passenger appliance and an oxygen supply unit stored in a container according to the invention. In this second variant the inventive concept recognized, that a passenger appliance and an oxygen supply unit can be stored in an integrated configuration in one single container according to the invention.

The invention also leads to a system of an arrangement of a number of containers according to the inventive concept. In a preferred development the containers are arranged for respective support of each other at at least one of each of the containers well's edge.

In particular the system has an arrangement of a number of oxygen supply devices and/or a number of passenger supply units in a ceiling-panel along an aircrafts cabin wherein each device and/or unit is stored in a container according to the invention. Particular preferred the containers are arranged for respective support at the containers well's edge. In a particular preferred development an arrangement of containers for oxygen supply units can be adjacent to or combined with a panel or another arrangement of containers for passenger supply units.

In particular in an alternative the system has an arrangement of a number of passenger supply devices, wherein each supply device has a passenger appliance and an oxygen supply unit stored in a container according to the invention. In particular an arrangement is in a ceiling-panel along an aircrafts cabin, in particular along an aircrafts cabin alley of seats. The invention recognized that a sensitive weightening of the advantages and disadvantages for a container of an oxygen supply unit with regard to mechanical strength as well as further safety demands and resistance to heat, flammability, electricity discharge and other hazardous impacts begins with a careful selection of the material of the container. The invention on the one hand recognized that for instance aluminum or other metal based materials for providing the container has advantages with regard to mechanical strength and resistance to mechanical stress. However, in each case a metal material container, in particular also an aluminum container, can be electrically uploaded and therefore endanger an electrical discharge during hazardous situations in an aircrafts cabin. Thus an aluminum container for an oxygen supply unit has to be grounded to an aircrafts construction for instance by bonding or the like contact methods. This leads to rather high maintenance and assembly costs in addition to the manufacturing costs for an aluminum container for an oxygen supply unit. On the other hand the invention recognized that plastic materials have severe disadvantages with regard to stability and mechanical stress. Also, as compared to an aluminum container, a plastic container can be of increased weight. In particular this holds true when a plastic container is to be supplemented to achieve a desired mechanical strength and resistance to hazardous impacts for instance by means of an increased wall thickness of the plastic container. These limiting conditions in mind the invention recognized that surprisingly the container well at least, in particular the container well and/or the container door, advantageously consists of a sheet-moulded compound material according to the invention were moulded from a composite of thermoset sheet material based on fiber-reinforced polymer matrices mainly.

By providing a sheet-moulded compound material for the container well at least, in particular the container well and/or the container door, the invention provides a good compromise between an advantageous solution for resisting mechanical strength on the one hand and an advantageous solution for resisting electrical uploads and/or inflammability or other hazardous impacts on the other hand. The invention recognized that sheet-moulded compound materials—like for instance based on polymer matrices selected from the group of polymer matrices selected from one or more of Bis-Maleimids (BMI), Epoxy (Epoxide), Phenolic (PF), Polyester (UP), Polyimide, Polyurethane (PUR) or Silicone or the like—can be manufactured sufficiently lightweight by implementation of fibers and also can be reinforced due to the fibers. In a particular preferred development it has been recognized that an unsaturated polyester resin or an epoxy or phenolic resin system is particularly advantageous to meet the compromise between a good mechanical stress resistance and a resistance to inflammability and electrical discharge or other hazardous impacts.

In particular with regard to the system of an arrangement of a number of oxygen supply devices in a ceiling-panel along an aircrafts cabin the invention recognized that the inventive use of a sheet-moulded compound material for the container well and/or the container door has sufficient flexibility and forms a good basis to provide support regions of adjacent containers at the containers well's edge. The invention recognized that—whereas aluminum containers fulfill in particular side stability when arranged between adjacent containers for providing an arrangement of a number of oxygen supply devices nevertheless the same—arrangements with plastic containers is far away from providing sufficient side stability. In particular the invention recognized that even when a plastic container might be considered to be as such stable; nevertheless in an arrangement of adjacent containers for providing an arrangement of a number of containers for oxygen supply devices a plastic container is endangered to collapse or being bent or deform when exposed to mechanical stress or pressure loads, in particular during an aforementioned hazardous impact in an aircraft's cabin.

Surprisingly, by using sheet-moulded compound material, the inventive concept allows for a container well's edge of sufficient support and stability between adjacent containers for supply units, in particular for oxygen supply units and/or panels of passenger supply units. Thus, in particular within a row arrangement of containers side by side for supply units (be that it may be for oxygen supply units or passenger supply units in a panel or another arrangement) along an aircrafts cabin alley of seats, when one container supports an adjacent container by contact the sheet-moulded compound material shows up to have particular advantageous features superior of those of aluminum and plastic materials as such.

For each of the aforementioned features it is claimed independent protection independent from all features of this disclosure.

These and further developed configurations of the invention are further outlined in the dependent claims. Thereby the mentioned advantages of the proposed concept are even more improved. For each of the features of the dependent claims it is claimed independent protection independent from all features of this disclosure.

It turned out in a preferred development that the container well and/or the container wall can be moulded from the composite of thermoset sheet material based on fiber-reinforced polymer matrices mainly; for instance by deep-drawing moulding preferably. Nevertheless also compression moulding and/or injection moulding is possibly used for providing the container well and/or the container door from the composite material. In particular the moulding is assisted by a suitable thermoforming process of raised temperature according to the needs of the polymer matrice used.

Generally a sheet-moulded compound material can be provided by dispersing rather long length fibers (greater than one inch); e.g. of chopped glass fibers on a bath of polymer matrices of thermoset material like polyester resin or the like. Generally SMC is described in the standard as EN14598. The longer the fiber is in the sheet-moulded compound the better the result for the instant inventive concept turns out.

In a particular preferred embodiment the sheet-moulded compound comprises directed long fiber systems also known as C-SMC material for providing endless directed fibers. This kind of directional system having endless fibers can be provided as a mesh system like a woven or knitted system or the like in the abovementioned polymer matrice.

It turns out that in a particular preferred development the container well's edge is preferably integrally moulded with the container well. Also, alternatively or additionally, a container door's edge is integrally moulded with the container door. In each case the edge moulded integrally with the body (of the container well and/or the container door) turns out to be particularly advantageous. The development has the advantage that a sufficient stress resistance is provided to the door and/or the container well by means of the integrally moulded edge. Additionally, particular advantageous, the opening function of the container, i.e. release of the containers door from the container's well, in an emergency situation turns out to function easy and safe even upon stress or pressure load on a containers side walls in an arrangement of a number of oxygen supply devices in the ceiling-panel along the aircrafts cabin.

In a particular preferred embodiment the container has a front, rear and side container wall and the container well's edge has a rear edge on a rear container wall and a front edge at the front container wall and a side edge at the side container wall. In particular the first side wall to a forward side adjacent container and/or a second side wall to a backward side adjacent container in an arrangement of adjacent containers have a side edge. At least the side edge is bead to form an edge bead. Thereby, in particular forward side and backward stress and pressure is safely released and a safe opening operation of the container door from the container well is guaranteed in an emergency situation. Unwanted jamming of door and well is avoided, even upon stress or pressure exposure.

In a preferred development the container has front, rear and side container walls with wall regions and transition regions there between wherein at least one wall and/or transition region has a reinforcing depressions, in particular on the front and rear container wall, in particular depressions extending into the container well's edge. It can be advantageous but not necessarily to provide at least one wall and/or transition region with reinforcing depressions. When providing reinforcing depressions it turns out that depressions extending into the containers well's edge, in particular into the containers well's side edge are particular preferred.

Nevertheless particular advantageously it turns out that by using a sheet-moulded compound material of the concept of the invention at least one wall of the container well and/or container door can be formed to have a wall thickness of below 2 mm, preferably below 1 mm. This is particular preferred to further decrease the weight of the container. Thus in a very preferred development all walls, that is the front rear and both side container walls have a wall thickness of below 2 mm, preferably below 1 mm.

In a particular preferred variant of the aforementioned development it turns out that the container well's edge has an edge material thickness and a container walls transition region has a transition region material thickness. The variant preferably provides that the edge material thickness and/or the transition region material thickness is at least partly larger than the wall thickness; in particular at least partly larger than a thickness of 2 mm, preferably larger than a thickness of 1 mm. The development recognized that—by providing thicker container well's edge and/or container walls transition regions—the stress and pressure resist of the container can be advantageously improved. Following the concept of this development, if provided, also the reinforcing depressions advantageously have a depression material thickness wherein the edge material thickness is a larger than the wall thickness.

In a particular preferred development for providing the aforementioned development the composite of thermoset sheet material based on fiber reinforced polymer matrices has large thickness regions and low thickness regions. The respective regions in the development are arranged such that for moulding a container wall's edge material thickness and/or a container wall's transition region material thickness and/or a reinforcing depression material thickness is thicker than the container wall's thickness, in particular thicker than 2 mm, preferably thicker than 1 mm.

The aforementioned concept of the development provides a particular preferred synergy of manufacturing process by using a preferred half product of SMC material variation in thickness of the regions.

For a more complete understanding of the invention, the invention will now be described in detail with reference to the accompanying drawing. The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. Further the features described in the description, the drawing and the claims disclosing the invention may be essential for the invention considered alone or in combination. In particular, any reference signs in the claims shall not be construed as limiting the scope of the invention. The wording "comprising" does not exclude other elements or steps. The wording "a" or "an" does exclude a plurality. The wording, "a number of" items, comprises also the number one, i.e. a single item, and further numbers like two, three, four and so forth.

The drawing shows in:

FIG. 1 a particular preferred embodiment of a container for an oxygen supply unit having different thickness regions resulting from different thickness regions of the half product of sheet-moulded compound material.

Figure 2:
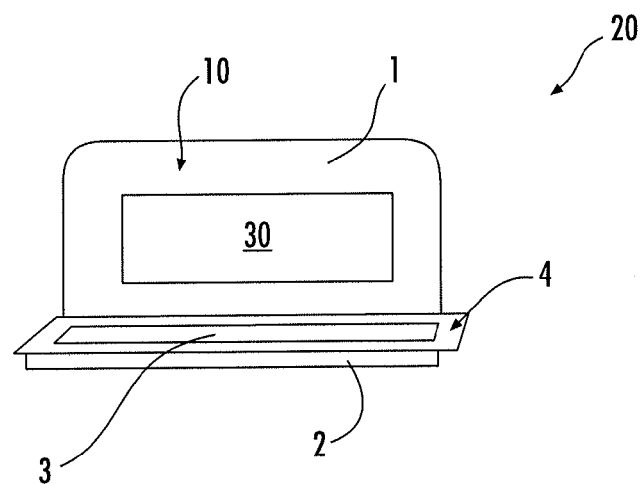
Figure 3:
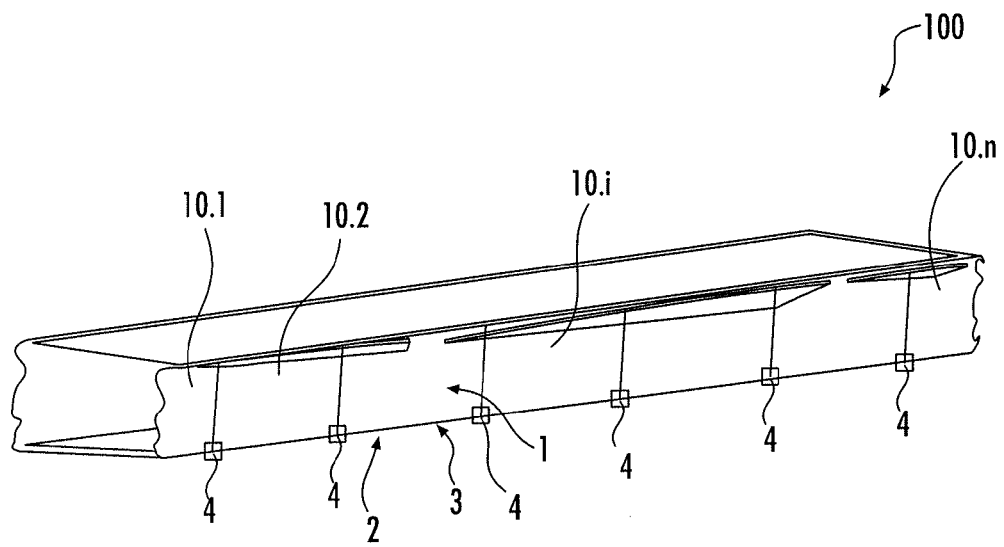

FIG. 2 an example of an oxygen supply device having an oxygen supply unit and a container of FIG. 1;

FIG. 3 a particular preferred embodiment of a system of an arrangement of containers—here a number of oxygen supply devices—in a ceiling-panel along an aircrafts cabin—here along an aircrafts cabin alley of seats—wherein each oxygen supply unit is stored in a container of FIG. 1.

FIG. 1 shows a container 10 for an oxygen supply unit as shown in the system 20 of FIG. 2. In the system 20 an oxygen supply device having an oxygen supply unit 30 and the container 10 of FIG. 1 is provided. The oxygen supply unit 30 can be an oxygen pressure cylinder or a chemical oxygen generator. Also the oxygen supply unit 30 can be a chemical oxygen container combined with an oxygen pressure buffer and a downstream connected electronic or mechanical flow regulator. The container 10 of FIG. 1 has a container well 1 and a container door 2 and a hinge profile 3 which on the one hand is adapted to keep the door on top of the well during usual flight conditions and on the other hand for safe opening during hazardous situations when needed.

Also, according to FIG. 3 the hinge profile 3 is adapted for assembling the container 10 into an arrangement 100 of a number of containers 10.i—this means containers 10.1, 10.2 and so forth until 10.n according to a predetermined number n—for a ceiling-panel along an aircrafts cabin. Thus the arrangement 100 of containers 10.1 to 10.n is for providing an arrangement of a number of oxygen supply devices like the one shown as system 20 in FIG. 2 along an aircrafts cabin alley of seats. As shown by the hinge bar 11—for cooperation with hinge openings 12 and hinge openings 13 in the hinge profile 3—the container door 2 is pivotably joint at a container well's edge 4. As recognized by the inventive concept the containers well's edge 4 establishes not only sufficient stability to the container well 1 of FIG. 1 as such and thus to the container 10 but also to an arrangement 100 of containers 10.1 until 10.n of FIG. 3 even when subjected to considerable stress and pressure load along an aircraft cabins elongate axis above an alley of seats. Thus the edge 4 functions as a stabilising frame for the container 10 as such. Also the edge is a load deducting element upon arrangement of the container 10 in the arrangement 100 shown in FIG. 3.

In the present embodiment the container well 1 with the container well's edge 4 the container door 2 with the container door's edge 5 and the hinge profile 3 consists of a sheet-folded compound material SMC. SMC is moulded from a composite of thermoset sheet material based on fiber-reinforced polymer matrices mainly.

In the instant embodiment the polymer matrices is an unsaturated polyester resin but in a variant also can be based on epoxy or also silicone, melamine, phenolic, polyimide and other resin systems. Generally these kinds of resins provide for a wide range of electrical, mechanical and thermoinsulating applications. In particular also flame retardant and heat resistant applications can be provided. In particular it turns out that upon providing a fiber-reinforcement to the polymer matrices this results in a high mechanical strength composite material being of high temperature and chemical resistance. The SMC is best-suited for static dissipation of stress and pressure as demanded for the instant container for an oxygen supply unit as such and for arrangement in a number of oxygen supply devices of FIG. 3.

In a varied embodiment the container 10 of FIG. 1 and the containers can 10.i of FIG. 3 can be adapted such that a passenger appliance is stored in the container. Thus the number of containers 10.i can form an arrangement of a number of oxygen supply devices as shown in FIG. 3. Also additionally or alternatively the number of containers 10.i can form a number of passenger supply units or a number of passenger supply devices as claimed in one of claim 15 or 16. Then the oxygen supply unit 30 of FIG. 3 could be replaced by a passenger appliance—like an oxygen supply unit, oxygen masks, warning lights, reading lights, airjet nozzle alone or in combination—and/or an oxygen supply unit, i.e. in an integrated or segregated configuration. In particular an arrangement of containers for oxygen supply units can be adjacent to or combined with a panel or another arrangement of containers for passenger supply units.

Generally a sheet-moulded compound is manufactured by dispersing long length fibers with a length greater than 1 inch; here the fibers are chopped glass fibers on a bath of polyester resin. The longer the glass fibers in a sheet-moulded compound the better are strength properties of the SMC as compared to standard bulk-moulded compound products BMC. During the manufacturing process a reservoir dispenses a measured amount of specified resin paste onto a plastic carrier film for example. This carrier film passes underneath a chopper which cuts the glass rowing onto the surface. Once these have drifted through the depth of the resin paste another sheet is added on top which sandwiches the cast. The sheets are compacted and then entered onto a take-up roll which is used to store the product while it matures. A carrier film is then later removed and the material is cut into charges. Depending on what shape is required determines the shape of the charge. Generally sheet-moulded compound benefits from a very high volume production ability, excellent part reproducibility and cost efficiency.

In the present embodiment a directional long fiber version of sheet-moulded compound material is used wherein rather long directional fibers are used to form a mesh like system. The mesh like system can in particular also use a woven or knitted system of fibers in a variant. For increasing mechanical strength of the container well 1 and container door 2 both edges, namely container well's edge 4 and container door's edge 5 are integrally moulded with the body of the container well and the container door respectively.

The container well in particular has a front, rear and side container wall 1.1, 1.2, 1.3, 1.4 and a floor 1.5 respectively. In the present embodiment a front edge 4.1, rear edge 4.2 and side edges 4.3, 4.4 are formed by integrally moulding the edges 4.1, 4.2, 4.3, 4.4 with the container well walls. Thus this results in a very high stabile version of the container well 1. In particular, on all the aforementioned sides the container edge 4 has an outer edge portion 4A extending crosswise from the walls and an inner edge portion 4B which smoothly extends from the outer edge portion 4A into the wall 1.1, 1.2, 1.3, 1.4 respectively. Thus also this construction increases static stability of the container. Moreover this construction is adapted to be easily produced within a thermoforming assisted deep-drawing moulding process for the sheet-moulded compound material SMC.

Also in the present embodiment in the transition regions 5.1, 5.2, 5.3, 5.4 between the walls 1.1, 1.2, 1.3, 1.4 depression regions are provided to further increase the static stability.

In a particular preferred variant of this embodiment the walls can be produced with a wall thickness well below 2 mm, preferably well below 1 mm, whereas the regions of edge transition have material thicknesses which are above a wall material thickness, in particular above a thickness of 2 mm, preferably above a thickness of 1 mm. Thus without increasing the weight of the container considerably these statically sensitive regions are further stabilized by an increased wall thickness of the light weight sheet-moulded compound material. Thus the static stability of the container 10 is drastically increased without considerable increasing the weight.

As it is to be understood the instant embodiments can be well produced from a composite of thermoset sheet-material based on fiber-reinforced polymer matrices which have large thickness regions and low thickness regions. The regions are arranged such that—after moulding—a container well's edge material thickness and a container well's transition region material thickness and reinforcing depression material thickness as outlined above is thicker than a container wall's thickness. In particular in the present embodiment this means that the large thickness regions are assigned to the edge 4, the depressions and the transition regions 5.1, 5.2, 5.3, 5.4 as outlined before. The low thickness regions are addressed to the regions of the walls 1.1, 1.2, 1.3, 1.4 as outlined above.

Thereby as such stable and also in an arrangement 100 a container 10 with high stress resistance is provided by the concept of the instant invention and as described in the aforementioned embodiment. In particular opening of the container door 2 is guaranteed even upon mechanical load or a hazardous impact on the container 10.

The invention claimed is:

1. A container for an oxygen supply unit or a passenger supply unit, the container comprising:
   a container well in a panel in an aircraft's cabin; and
   a container door pivotably joined to the container well at an edge of the container well such that the container door is pivotable about a hinge at the container well's edge, wherein:
   the container well comprises a sheet moulded compound material moulded from a composite of thermoset sheet material comprising fiber-reinforced polymer matrices;
   the container has front, rear, and side container walls with wall regions and transition regions there between, wherein each of the wall regions has a thickness of approximately 2 mm or less; and
   the container well's edge and the transition regions both include portions with thicknesses greater than the thickness of each of the wall regions.

2. The container of claim 1 wherein at least one of the container well and the container wall is moulded from the composite by at least one of deep-drawing moulding, compression moulding, injection moulding, and moulding assisted by thermoforming.

3. The container of claim 1 wherein the polymer matrices are matrices of Bis-Maleimids, Epoxy, Phenolic, Polyester, Polyimide, Polyurethane, Silicone, wherein the Polyester is an unsaturated polyester resin, the Epoxy is an epoxy resin system, and the Phenolic is a phenolic resin system.

4. The container of claim 1 wherein the fiber-reinforced polymer matrices comprise at least one of carbon, graphite, and glass fiber reinforcement.

5. The container of claim 1 wherein the sheet moulded compound material is a low profile-system, a low shrink-system, or a directed long fiber system of sheet moulded material.

6. The container of claim 5 wherein the fibers of the reinforcement are endless fibers of a directional system of fibers forming a mesh system of fibers in a woven or knitted configuration.

7. The container of claim 1 wherein at least one of the following is integrally moulded:
   the container well's edge with the container well and
   an edge of the container door with the container door.

8. The container of claim 7 wherein the container well's edge has a rear edge on the rear container wall and a front edge on the front container wall and a side edge on the side container wall of the container well and at least the side edge is beaded to form an edge bead.

9. The container of claim 1 wherein at least one wall or transition region further comprises reinforcing depressions on the front and rear container wall that extend into the container well's edge.

10. The container of claim 1 wherein all wall regions have a thickness of 1 mm or less.

11. The container of claim 9, wherein the reinforcing depressions have a depression material thickness that is greater than the thickness of the wall regions.

12. The container of claim 1 wherein the composite of thermoset sheet material comprising fiber-reinforced polymer matrices has a high thickness region and a low thickness region arranged such that after moulding, at least one of the container well's edge, the transition regions, and a reinforcing depression has a material thickness that is greater than the thickness of the wall regions.

13. The container of claim 1, wherein the container is used with the oxygen supply unit and wherein the oxygen supply unit has at least one of an oxygen pressure cylinder and a chemical oxygen generator.

14. A passenger supply unit having one or more passenger appliances stored in a container of claim 1.

15. A passenger supply device having a passenger appliance and an oxygen supply unit stored in a container of claim 1.

16. The container of claim 13, further comprising a plurality of containers in a ceiling-panel along an aircraft's cabin alley of seats, wherein the containers are arranged for respective support of each other at least one of each of the containers well's edge.

17. A container for an oxygen supply unit or a pasenger supply unit, the container comprising:
   a container well in a panel in an aircraft's cabin; and
   a container door pivotably joined to the container well at an edge of the container well such that the container door is pivotable about a hinge at the container well's edge, wherein:
   the container well comprises a sheet moulded compound material moulded from a composite of thermoset sheet material comprising fiber-reinforced polymer matrices;
   the container has front, rear, and side container walls with wall regions and transition regions there between, wherein each of the wall regions has a thickness of approximately 2 mm or less;
   the container well's edge and the transition regions both include portions with thicknesses greater than the thickness of each of the wall regions;
   the container well's edge is integrally moulded with the container well; and
   the container well's edge comprises an outer edge portion and an inner edge portion wherein (i) the inner edge portion is nonparallel to and continuous with the container walls and (ii) the outer edge portion is continuous with the inner edge portion and is approximately parallel to the container walls.

18. The container of claim 17, wherein the inner edge portion is approximately perpendicular to the container walls and the outer edge portion is approximately perpendicular to the inner edge portion.

19. The container of claim 17, wherein the container door comprises an edge portion that is integrally moulded with the container door and the edge portion is approximately perpendicular to the container door.

* * * * *